United States Patent [19]

Spoltman et al.

[11] Patent Number: 5,715,369
[45] Date of Patent: Feb. 3, 1998

[54] SINGLE PROCESSOR PROGRAMMABLE SPEECH RECOGNITION TEST SYSTEM

[75] Inventors: James H. Spoltman, Snohomish; Michael J. Rozak, Issaquah; Walter Irving Wittel, Jr., Redmond; Gregory G. Landon, Kent, all of Wash.

[73] Assignee: Microsoft Corporation, Redmond, Wash.

[21] Appl. No.: 562,760

[22] Filed: Nov. 27, 1995

[51] Int. Cl.$^6$ .................................. G10L 3/00
[52] U.S. Cl. .......................... 395/2.79; 395/2.81
[58] Field of Search ........................ 395/2.79, 2.4, 395/2.45, 2.81, 2.5, 2.52, 2.53, 2.55, 2.56, 2.6, 2.61

[56] References Cited

U.S. PATENT DOCUMENTS

| | | | |
|---|---|---|---|
| 4,653,097 | 3/1987 | Watanabe et al. | 395/2.41 |
| 4,866,778 | 9/1989 | Baker | 395/2.4 |
| 5,333,275 | 7/1994 | Wheatley et al. | 395/2.52 |
| 5,572,570 | 11/1996 | Kuenzig | 379/1 |

Primary Examiner—Allen R. MacDonald
Assistant Examiner—Richemond Dorvil
Attorney, Agent, or Firm—Duft, Graziano & Forest, P.C.

[57] ABSTRACT

A speech recognition test system comprising a single host processing system having a host processor and a memory device, wherein the memory device contains a plurality of audio files accessible by the host processor. The test system also includes a speech recognition application having a vocabulary, an independent test application, a means for concurrently executing the speech recognition application and the independent test application on the host processor, a means for queuing the audio files as input to the speech recognition application by way of the test application, a means for programming the test application at configuration time to expand the vocabulary of the application being tested and/or other voice gender, volume, and speed playback parameters, and a means for capturing and evaluating test results from the speech recognition application by way of the test application. In an alternative embodiment the speech recognition test system includes an audio input/output device operatively connected to the host processor, and a means for redirecting output from the audio input/output system as input to itself.

18 Claims, 5 Drawing Sheets

SINGLE PROCESSOR PROGRAMMABLE SPEECH RECOGNITION TEST SYSTEM

BACKGROUND OF THE INVENTION

1. Field of the Invention

This invention relates to speech recognition applications, and more particularly, to a test application for testing the effectiveness of a speech recognition application.

2. Description of the Related Art

A speech recognition system is typically implemented on a computer having a host processor, an audio input/output device, and a speech recognition application. An audio input/output device is an apparatus commonly referred to as a "sound card" that can support a microphone as an input device to an input port and a speaker as an output device to an output port. The audio input/output system also includes the necessary drivers and related control software required to support the input and output ports. The microphone input delivers an analog input signal to the sound card where the analog input signal is digitized into a digital data stream in a manner well known in the art. The digital data stream is routed as input to the speech recognition application that processes the data. A response from the speech recognition application that requires communication to a user can be output by way of the speaker device attached to the output port or displayed as text on a display screen.

One early technique for testing a speech recognition system required that a person manually generate real time input to the system by speaking into the microphone. One problem with this test approach was that the testing was highly labor intensive. Another problem with this test approach was that the human factor involved prevented consistency from one test to the next because even the same person performing a seemingly identical test could not precisely reproduce the test twice in a row. For these reasons, manually testing a speech recognition system was, and remains, undesirable.

Another early technique for testing a speech recognition system required coordinating a host processor and an independent tape recorder. The tape recorder would replay a voice recording over a speaker and into a microphone connected to the host processor as previously discussed. One problem with this test approach was the difficulty with coordinating the independent tape recorder and the host processor so that the test system could operate unattended. Another problem with this test approach was the poor reproduction quality of the prerecorded voice input. A final problem with this test approach was that the prerecorded voice contained background noise that existed when the recording was created. Therefore, when the recording was played into the microphone connected to the host system, the host system would detect recorded background noise from the tape recording in addition to ambient background noise occurring in real time during the test. For these reasons, tape recorded testing for a speech recognition system was, and remains, undesirable.

One solution to the tape recording problem of compounded noise input to the speech recognition system was to bypass the open air speaker and microphone interfaces by directly connecting the tape recorder output port to the sound card input port via an appropriate communication link. While this solution eliminated the ambient noise input that occurred during testing, the poor reproduction quality of the prerecorded voice input and the lack of coordination between the tape recorder and the speech recognition system remained problematic. For this reason, tape recorded testing for a speech recognition system remains undesirable.

One present technique for testing a speech recognition system is a fully automated test system using two computers where both computers are connected to each other via a dedicated communication link, and each computer contains its own sound card for audio input/output. The first computer acts as a master computer by coordinating test initiation and capturing test results by way of the dedicated communication link, in addition to generating the voice output for each test by way of a sound card. The second computer acts as a slave computer by hosting the speech recognition application that receives voice input from the master computer. In operation, the master and slave computers coordinate each test by way of a synchronous transmit and acknowledge communication protocol over the dedicated communication link. When a test is initiated, voice output exits the master computer's sound card and is received as input by the slave computer's sound card. The voice input is delivered by way of a speaker/microphone, setup or a wire from output port to input port, as previously discussed with the tape recording test system. Where the speaker/microphone setup is used, the test system is subject to the same distortion and duplicate noise problems as existed in the tape recording test system. A test process on the slave computer would note the success or failure of a particular test and report the results to the master computer prior to continuing to the next test. Although this test system is fully automated, it requires a complex multi-computer hardware configuration and a complex communication protocol for test coordination. Therefore, this test system is not cost effective to use because it demands too many hardware and human resources to implement and maintain.

For these reasons there has been a long felt need for a fully automated test system that eliminates external noise factors, precisely controls audio input data, and is easily and cost effectively implemented and maintained. This need has heretofore not been met.

SUMMARY OF THE INVENTION

The above described problems are solved and an advance achieved in the field of test systems for testing the effectiveness of speech recognition applications, by way of the present invention. The speech recognition test system of the present invention comprises a single host processing system having a host processor and a memory device, wherein the memory device contains at least one audio file that is accessible by the host processor. In addition, the system includes a speech recognition application and an independent test application that are both resident on the host processor. The test application and the input it supplies to the speech recognition application are transparent to the speech recognition application. The speech recognition application on the host processor is executed concurrently with the test application thereby eliminating the need for a multi-computer test configuration with a complex communication protocol therebetween. At least one digital audio file is queued as input to the speech recognition application by way of the test application. As each test is completed, the speech recognition application output and any test results are captured and recorded by the test application. The speech recognition test system can also include a means for controlling playback characteristics for the queued audio files by way of the test application.

An alternative configuration of the present invention includes a single sound card connected to the single host processing system where the output from the sound card is redirected as the input to the same sound card by way of an internal sound card loop-back circuit. This configuration allows the test application to queue audio files, route the audio files through the output path of the sound card and into the input path of the same sound card so that the normal processing path through the sound card and speech recognition application is exercised.

Additional features of the speech recognition test system of the present invention include the ability to repeat any segment of any one of the at least one audio file on the queue, the ability to set a timer to determine an amount of silent space between each of the at least one audio file on the queue, the ability to adjust a playback volume for any one of the at least one audio file, the ability to record test status in a test status file, and the ability to display the test status on a visual monitor concurrently with a graphic indication of the data being played back from the at least one audio file.

DETAILED DESCRIPTION

Figure 1:
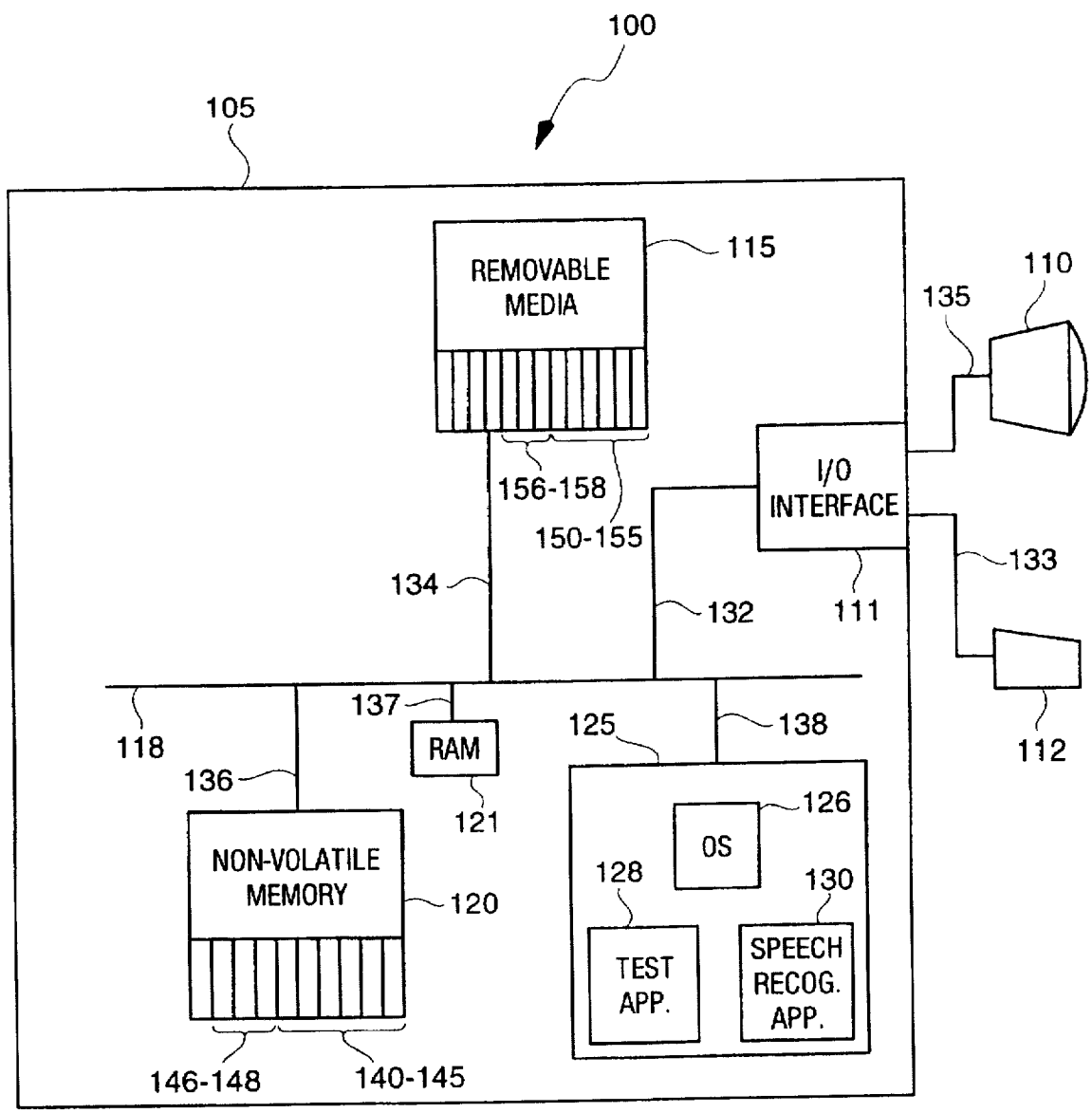
FIG. 1 illustrates the hardware configuration for a speech recognition test system in block diagram form.

Speech Recognition Test System—FIG. 1

FIG. 1 illustrates the hardware configuration for the preferred embodiment of the speech recognition test system 100 of the present invention in block diagram form. The hardware configuration comprises a single host processing system 105 having a memory device such as nonvolatile memory 120 and/or removable media 115. Memory devices 120 and/or 115 contain at least one audio file 140–145 and/or 150–155 respectively that are accessible to processor 125. The single host processing system 105 is a standard personal computer widely understood and available in the industry that satisfies the performance requirements of the test application and the speech recognition application being tested. Memory device 120 is any non-volatile memory media such as a hard disk drive widely known and available for use in personal computer systems. Memory device 115 is any non-volatile and removable memory media such as a floppy disk, disk card, tape, or solid state device widely known and available for use in personal computer systems. Random Access Memory (RAM) 121 is a volatile on-board memory used primarily by processor 125 to execute programs or for other administrative purposes in a manner well known in personal computer systems. Processor 125 is the device within the single host processing system 105 that oversees all host system functions, communications, and application program execution by way of a standard operating system 126.

Processor 125 is capable of executing a speech recognition application 130 concurrently with a test application 128. Speech recognition application 130 is the object of the testing process and test application 128 is the specific process performing the testing activities in a manner that is independent and transparent to the speech recognition application 130.

Single host processing system 105 also includes user oriented input and output devices such as a display monitor 110 for viewing output and a keyboard/mouse 112 for inputting commands and/or information to the system 105. The display monitor 110 and keyboard/mouse 112 are both connected to the system 105 by way of monitor lead 135 and keyboard/mouse lead 133 to input/output interface 111.

Communications among the above mentioned components in single host processing system 105 are supported by a communications bus 118 in a manner well known in personal computer systems. Memory devices 115, 120, and 121 are connected to communications bus 118 by way of memory device leads 134, 136, and 137 respectively. Input/output interface 111 and processor 125 are connected to communications bus 118 by way of input/output interface lead 132 and processor lead 138 respectively.

Test application 128 is capable of queuing at least one audio file 140–145 and/or 150–156 for use as input by speech recognition application 130, by accessing the appropriate memory device 115 and/or 120 through the operating system 126 facilities and communications bus 118. Any number of audio files may be stored on memory devices 115 and/or 120 as deemed necessary by the user. Audio files 140–145 and 150–155 are for illustration purposes and are not intended as a limitation on the minimum or maximum number of available audio files. Each audio file 140–145 and 150–155 contains at least one audio "phrase" therein.

Test application 128 is also capable of capturing and recording output from speech recognition application 130. The output includes, but is not limited to, test results such as successful or unsuccessful test indications, and other relevant information such as the present test being executed, the remaining tests queued for execution, and which audio files are queued for a particular test. The output from speech recognition application 130 can be recorded on either or both memory devices 115 and 120 in test result files 156–158 and 146–148 respectively. The number of test result files illustrated in FIG. 1 is for illustration purposes and is not intended as a limitation on the minimum or maximum number of available test result files. Output including test results can be displayed for user viewing by way of display monitor 110.

Figure 2:
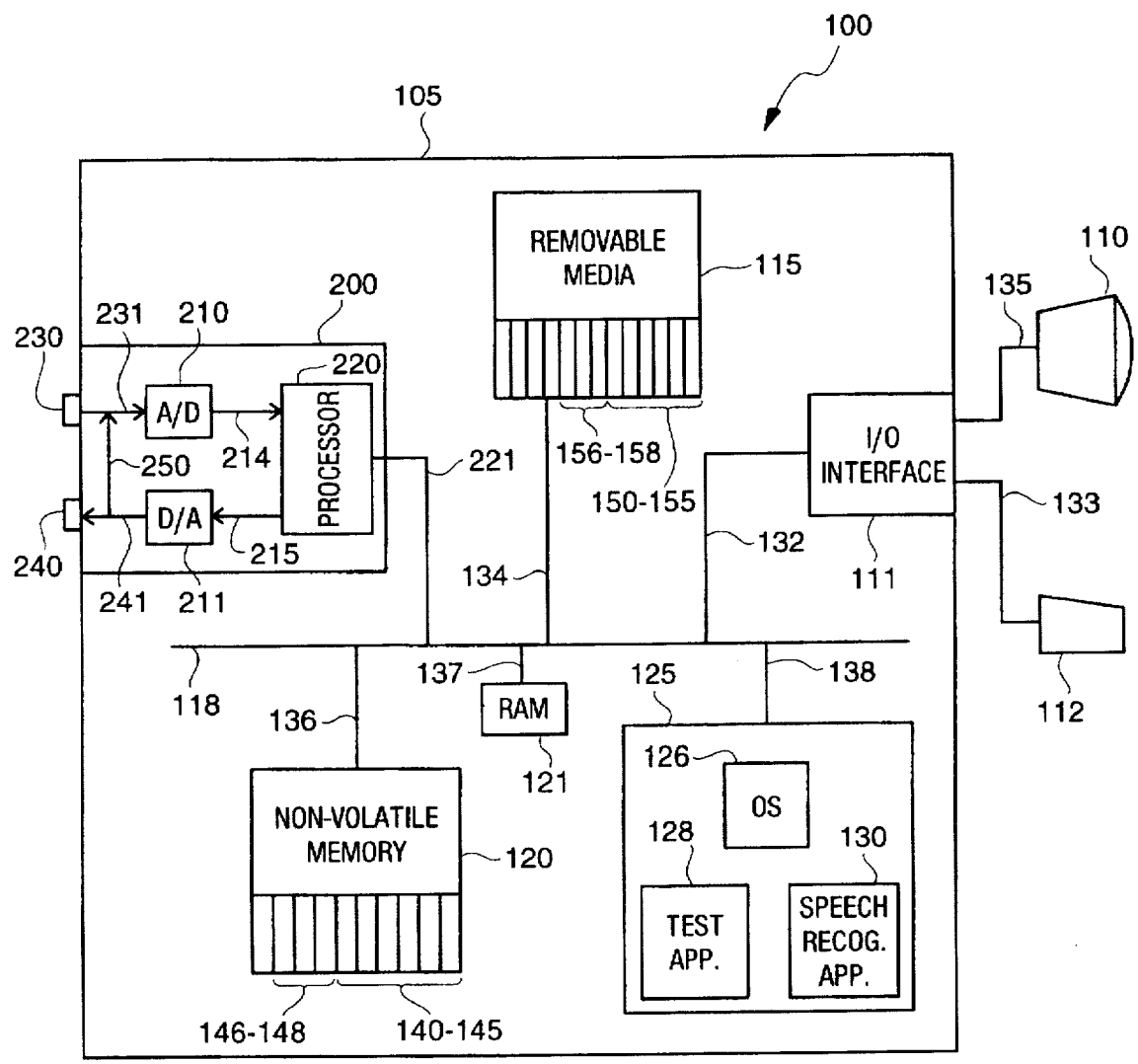
FIG. 2 illustrates an alternative hardware configuration for a speech recognition test system in block diagram form.

Alternative Speech Recognition Test System—FIG. 2

FIG. 2 illustrates an alternative hardware configuration for speech recognition test system 100 in block diagram form. The alternative configuration of FIG. 2 is similar to the configuration illustrated in FIG. 1 with the addition of an audio input/output system 200, commonly referred to as a sound card. Audio input/output system 200 is operatively connected to all components within the single host processing system 105 by way of audio system lead 221 to communications bus 118. Audio input/output system 200 includes end to end input and output paths for use by the speech recognition test system 100 by way of an input port 230, an analog input lead 231, an analog to digital converter 210, a digital input lead 214, a signal processor 220, a digital output lead 215, a digital to analog converter 211, an analog output lead 241, and an output port 240. A microphone is typically attached to the input port 230 and a speaker is attached to the output port 240. Audio input/output system 200 can be implemented with analog and digital converters or fully digital end to end.

The important feature in the present invention is loop-back 250 which redirects the output from analog output lead 241 as input to analog input lead 231. With loop-back 250 in place, test application 128 can queue audio files 140–145 and/or 150–155 as output to audio input/output system 200.

Loop-back 250 redirects the output as input so that a thorough system test of all systems involved in delivering input to the speech recognition application 130 is completed in as realistic a manner as is possible while maintaining full automation of the testing in progress. A loop-back can alternatively be located between digital output lead 215 and digital input lead 214, or between output port 240 and input port 230.

Figure 3:
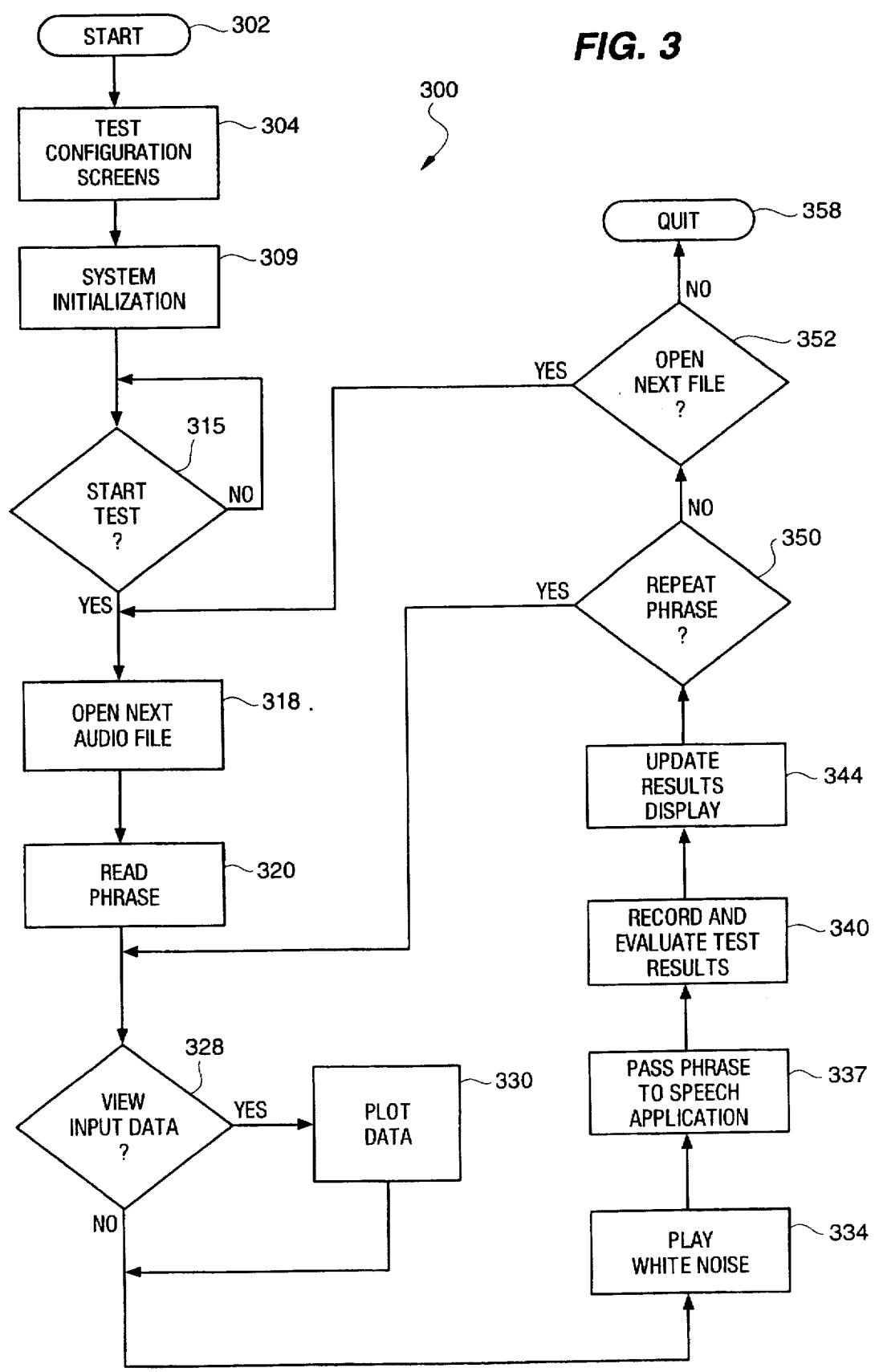
FIG. 3 illustrates the primary operational steps for the speech recognition test system in flow diagram form.

Method of Using The Speech Recognition Test System—FIG. 3

FIG. 3 illustrates the primary operational steps 300 for using the speech recognition test system 100. The speech recognition test system 100 is controlled by test application 128. Test application 128 is a computer program that is independent from and transparent to the speech recognition application 130. The input source provided by test application 128 to the speech recognition application 130 is also transparent to the speech recognition application 130. Specifically, the speech recognition application 130 has no knowledge of the concurrently executing test application 128. In addition, the speech recognition application 130 can not distinguish between an input source originating from a real time user speaking into a microphone connected to a sound card, or input originating from the test application 128. The test application 128 also controls user input and display features and data manipulation features by way of a collection of program functions implemented in a structured programming language. The preferred embodiment of test application 128 is an object oriented computer program written in the C++ programming language.

Test application 128 starts processing at step 302. Test configuration display screens 400 and 500 shown in FIG. 4 and 5 respectively, are displayed at step 304. Discussion of FIG. 4 and 5 details are found in separate sections below. Test configuration display screens 400 and 500 display default test configuration parameters that are editable by user input produced from keyboard/mouse 112 manipulated selection menus or alpha-numeric typed input. The configuration information is used in step 309 to initialize the test application 128 and speech recognition application 130. Initializing the test application 128 includes locating the specified audio files and loading Dynamic Link Library (DLL) or other startup files necessary for proper test application operation. Test configuration parameters may also be used to communicate the desired volume or speed for replaying a phrase. Initializing the speech recognition application 130 is independent from the test application 128 initialization, and includes loading a "grammar" containing the vocabulary of the speech recognition application, and loading the appropriate language version of the speech recognition application 130 itself.

Test application 128 awaits a start command at decision step 315 by way of user generated input, preset timer, or time of day alarm. If no start command is forthcoming, test application 128 idles at step 315. When the start command is given, processing continues at step 318 where the next audio file on the audio file queue is opened for reading. The phrase in the open audio file is read at step 320.

Figure 6:
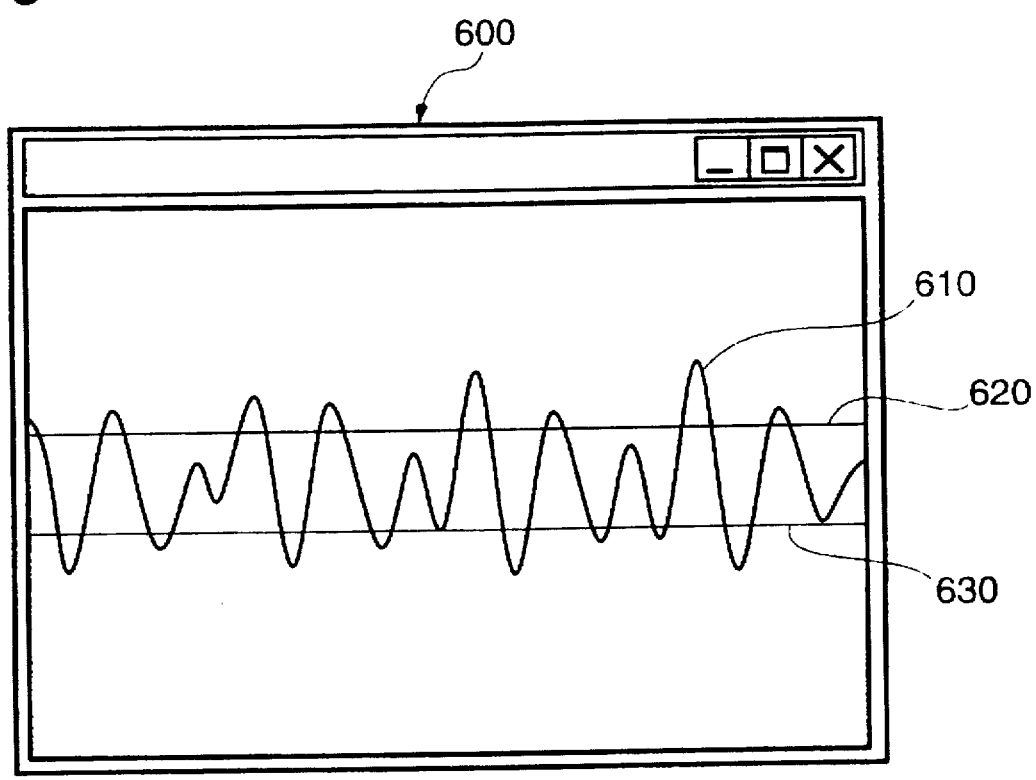
FIG. 6 illustrates audio input as it appears on a display screen.

A real time plot of the audio data being input to the speech recognition application 130 can be displayed on display monitor 110 at step 330. A sample audio display 600 is shown in FIG. 6. If no audio display is requested at decision block 328, processing continues at step 334 where the test application 128 plays white noise between phrases to more accurately emulate real time pauses in speech. A delay between phrases is variable and the default time delay is zero minutes and seconds.

The test application 128 passes an input phrase to the speech recognition application 130 at step 337. Volume and speed adjustments are made at this time according to the configuration parameters previously provided by the user. Volume and speed adjustments are necessary because each phrase in each audio file may have been recorded at different volumes and speeds.

As the speech recognition application 130 processes the audio data input, whether the input was routed directly from test application 128 or by way of loop-back 250, test application 128 captures output from speech recognition application 130, including any test results, and records the output in the test result files 146–148 and/or 156–158 specified by location in the test configuration display screen 400 in step 304. Test results are raw data that are continuously displayed in real time on display monitor 110 at step 344. The success or failure of a given test is recorded in an output file with such phrases as "recognized", "unrecognized", "mis-recognized", "unheard", "multiple utterances detected", and "unknown error" for example.

The test application 128 determines whether the user has requested that any portion of a phrase should be repeated at decision step 350. If the present phrase is being repeated, test application 128 continues at step 328. If no repeat is requested at decision step 350 and the test application 128 is finished with the present audio file and processing continues at decision step 352. The test application 128 determines whether there is another audio file available to read from at derision step 352. If another audio file is available at decision step 352, processing continues at step 318. If no additional audio files are available on the audio file queue, then processing continues at step 358 where test application 128 closes all audio files, the speech recognition grammar is released, and the speech recognition application is released prior to the test system exiting.

Figure 4:
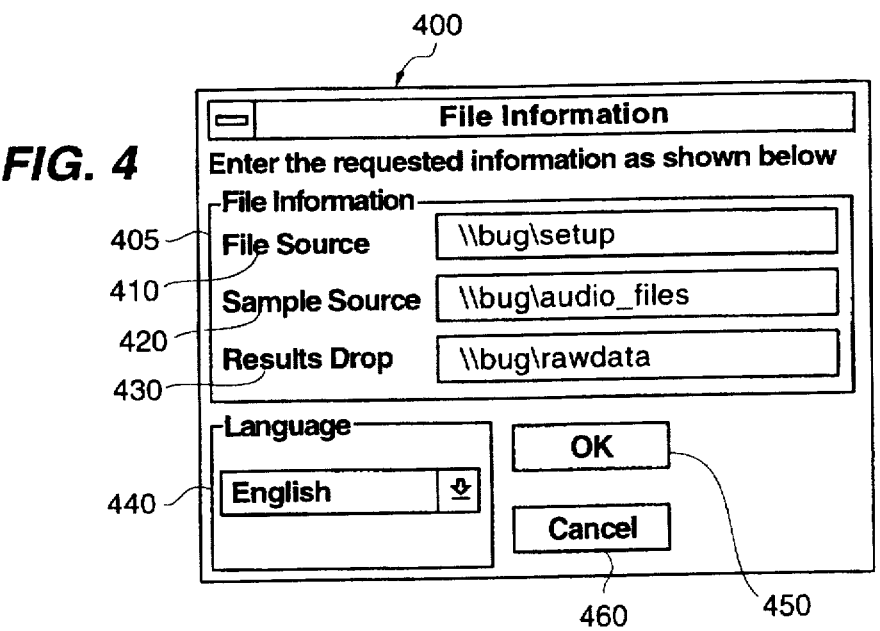
FIG. 4 illustrates a first test configuration display screen in block diagram form.
Figure 5:
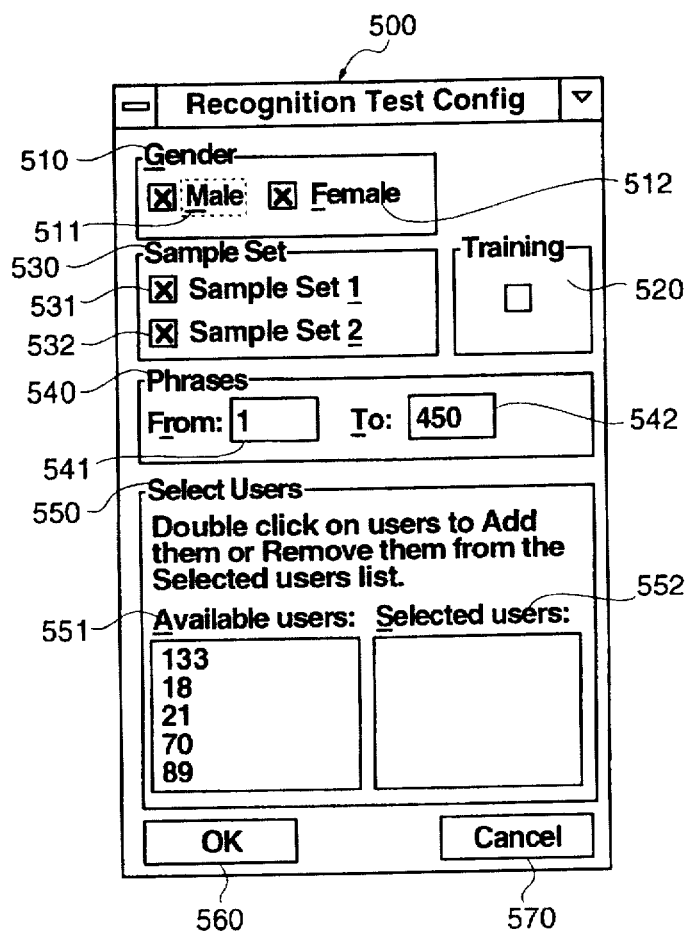
FIG. 5 illustrates a second test configuration display screen in block diagram form.

Test Configuration Display Screens—FIGS. 4 & 5

FIG. 4 illustrates an example of a first test configuration display screen 400 that identifies the location of basic test application file information 405, including startup files 410, the location of the audio files 420, and the location of the test results files 430. The test configuration display screen 400 can contain a predetermined default path to a default file locations 410, 420, and 430, or alternatively display the most recently entered file locations from the previous screen display. The actual file location for any one file is irrelevant so long as the file location can be resolved when it is time to open the file.

The language selection field 440 is an editable selection menu for identifying the language the speech recognition application 130 is to accept. A different version of the speech recognition application 130 is loaded at initialization time depending on the language selected.

The "OK" icon 450 enters the parameters displayed in the test configuration display screen 400. The "cancel" icon 460 aborts any entry changes to the parameters originally displayed when the test configuration display screen 400 was most recently displayed.

FIG. 5 illustrates an example of a second test configuration display screen 500 for defining the input selection from the plurality of audio files. The gender selection field 510 can be used to limit the audio input to male voice 511, female voice 512, or both.

The training selection field 520 indicates whether the test application 128 will send new words to "teach" the speech recognition application 130 in order to expand the vocabulary or "grammar" of the speech recognition application 130. If the training selection field 520 is not selected, the test application 128 proceeds in a manner that only exercises the existing grammar of the speech recognition application 130 without teaching new words.

The sample selection field 530 identifies which subset of the plurality of audio files will be replayed to the speech recognition application 130. Any number of sample sets can be defined and displayed in the sample selection field 530. FIG. 5 illustrates two sample sets 531 and 532 respectively.

The phrase selection field 540 allows the user to select a number of available phrases within a sample set 531, for example, by stating a number range in a "from" field 541 to a "to" field 542. The present implementation expects one phrase per audio file, although the test system can be expanded to accommodate multiple phrases per audio file.

The select user field 550 identifies the available list of different persons' voices stored within a given sample set by number. For example, if a given sample set 531 contains phrases of male voices recorded by persons 1, 3, and 5, in addition to female voices recorded by persons 2 and 4. Specific male and list of "users" includes the recorded voice of persons 1-5. Specific male and female voices can be selected from the mix of male and female voices by selecting the appropriate number in the available user column 551. A selected number will be displayed in the selected user column 552. This feature permits narrowing the audio input to specific types of male and/or female voices beyond the more basic gender selection field 510 can provide.

The "OK" icon 560 enters the parameters displayed in the test configuration display screen 500. The "cancel" icon 570 aborts any entry changes to the parameters originally displayed when the test configuration display screen 500 was most recently displayed.

Input Data Display Screen—FIG. 6

FIG. 6 illustrates an input display 600 of the real time audio input 610 as the audio input is passed to the speech recognition application 130. The real time audio input 610 is displayed in wave form to show the input's amplitude. The upper limit 620 and lower limit 630 can be the minimum and maximum volume, for example, so that the user can determine whether the test system volume is within a satisfactory range. The input display 600 can be configured to show the speed of audio input as required.

Conclusion

While the present invention has been specifically described with references to FIGS. 1–6, with emphasis on the fact that a single host processor contains a test application that is independently functional with respect to the speech recognition application, it should be understood that the figures are for illustration only and are not limitations on the invention. It is expected that additional embodiments of the claimed idea that are within the scope of the invention as claimed below will be created by persons skilled in the art.

We claim:

1. A speech recognition test system comprising:

a single host processing system having a host processor and a memory device, wherein said memory device contains a plurality of audio files accessible by said host processor and each of said plurality of audio files having at least one audio phrase therein;

a speech recognition application having a vocabulary;

a test application;

means for concurrently executing said speech recognition application and said test application on said host processor; and means for exercising said speech recognition by way of said test application in a manner that includes:

means for selectively queuing a set of said plurality of audio files as a transparent input source to said speech recognition application by way of said test application;

means for expanding said vocabulary of said speech recognition application in response to previously unknown phrases input in real time to said speech recognition application by said test application; and means for capturing output from said speech recognition application.

2. A speech recognition test system according to claim 1 including:

means for evaluating said output relative to a model output baseline.

3. A speech recognition test system according to claim 1 including:

means for controlling playback characteristics including voice gender, volume, and speed, for said set of said plurality of audio files by way of said test application.

4. A speech recognition test system according to claim 1 including:

an audio input/output system operatively connected to said host processor; and means for redirecting output from said audio input/output system as input to itself.

5. A speech recognition test system according to claim 1 wherein said test application is transparent to said speech recognition application.

6. A speech recognition test system according to claim 1 including:

means for displaying said output from said speech recognition application for user viewing.

7. A method for using a speech recognition test system in a single host processing system wherein a host processor within said single host processing system has access to a memory device that contains at least one audio file each having at least one phrase therein, said method comprising the steps of:

concurrently executing a speech recognition application and a test application on said host processor, wherein said test application is transparent to said speech recognition application;

exercising said speech recognition application by said test application in a manner that includes:

controlling playback characteristics including voice gender, volume, and speed, for said at least one phrase on said at least one audio file;

queuing said at least one audio file for said speech recognition application to receive as input from an input source; and capturing output from said speech recognition application.

8. A method according to claim 7 wherein said step of capturing includes:

recording said output in a result file;

evaluating said output relative to a model output baseline.

9. A method according to claim 8 including:

displaying an evaluation result of said output on a visual monitor concurrently with a graphic representation of audio file data that was input to the speech recognition application to produce said output, in response to said step of evaluating.

10. A method according to claim 7 wherein said step of queuing includes:

repeating any segment of any one of said at least one audio file on said queue.

11. A method according to claim 7 including:
replaying an amount of white noise between a first of said at least one phrase and a second of said at least one phrase.

12. A method according to claim 7 including:
redirecting output from an audio input/output system as input to itself, wherein said audio input/output system is operatively connected to said host processor.

13. A method according to claim 7 wherein said input source is transparent to said speech recognition application.

14. A method for using a speech recognition test system in a single host processing system wherein a host processor within said single host processing system has access to a memory device that contains at least one audio file each having at least one phrase therein, said method comprising the steps of:
concurrently executing a speech recognition application and an independent test application that is transparent to said speech recognition application on said host processor;
exercising said speech recognition application by way of said independent test application in a manner that includes:
controlling test configuration parameters including voice gender selection, playback volume, and playback speed;
queuing said at least one phrase for input to said speech recognition application from said test application;
controlling audio file input to said speech recognition application in view of said test configuration parameters;
expanding said vocabulary of said speech recognition application in response to previously unknown phrases input in real time to said speech recognition application by said independent test application; and
replaying said at least one phrase to said speech recognition application from said test application by way of a single sound card that is operatively connected to said host processor.

15. A method according to claim 14 including:
evaluating said output relative to a model output baseline.

16. A method according to claim 15 including:
displaying an evaluation of said output on a monitor concurrently with a graphic representation of audio file data being input to said speech recognition application.

17. A method according to claim 14 wherein said input is from a source that is transparent to said speech recognition application.

18. A method according to claim 14 including:
directing audio data as output through said sound card; and
redirecting said output from said sound card as input to said sound card by way of a redirection circuit in said sound card.

\* \* \* \* \*